Aug. 18, 1953
H. D. McCARTY
2,649,017
PHOTOGRAPHIC LIGHT COMPARATOR FOR
DETERMINING DIAPHRAGM ADJUSTMENT
Filed June 10, 1950
2 Sheets-Sheet 1
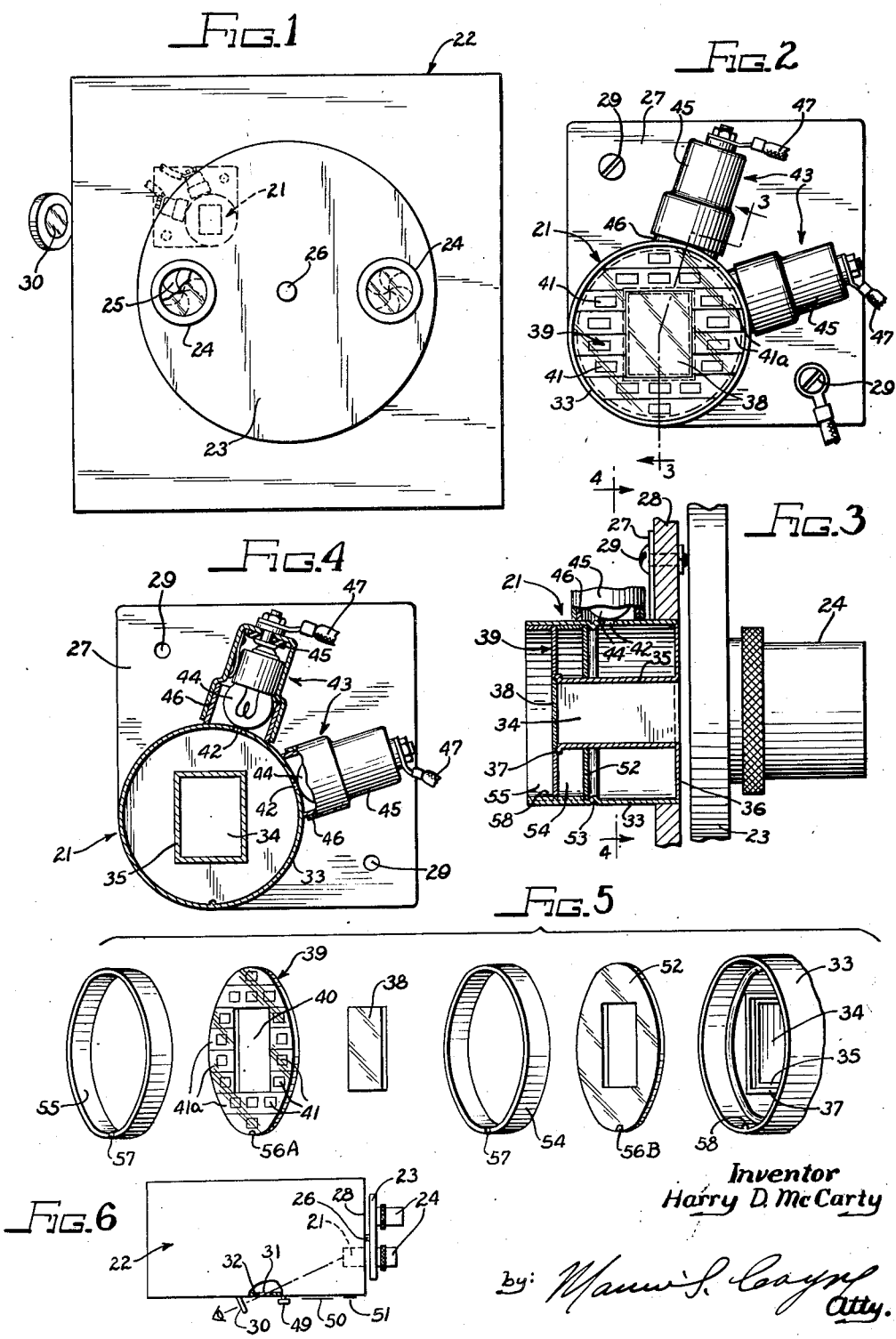
Inventor
Harry D. McCarty
by: [signature] Atty.

Aug. 18, 1953 H. D. McCARTY 2,649,017
PHOTOGRAPHIC LIGHT COMPARATOR FOR
DETERMINING DIAPHRAGM ADJUSTMENT
Filed June 10, 1950 2 Sheets-Sheet 2
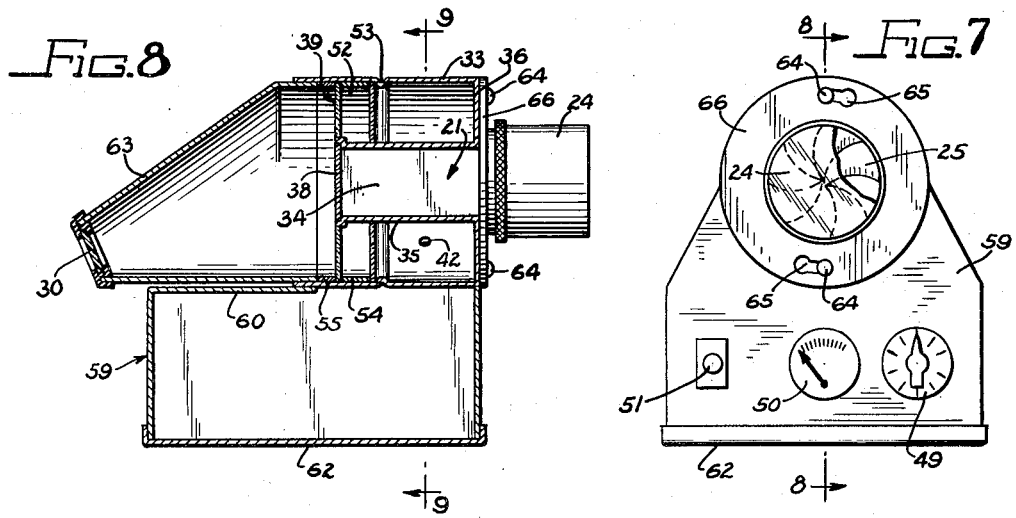
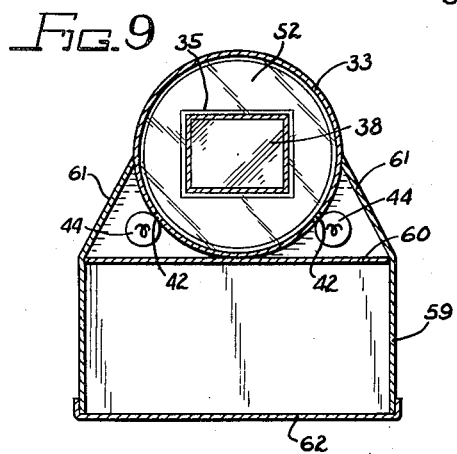
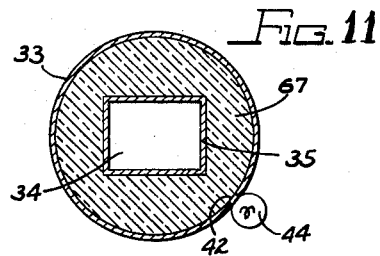
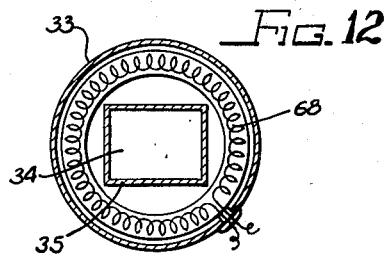
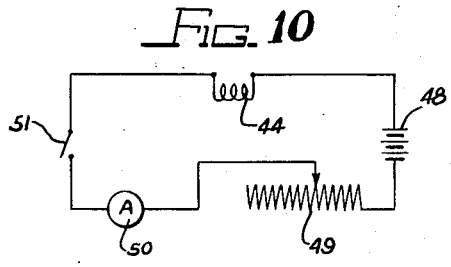
Inventor
Harry D. McCarty
by: [signature]
atty.

Patented Aug. 18, 1953

2,649,017

UNITED STATES PATENT OFFICE 2,649,017

PHOTOGRAPHIC LIGHT COMPARATOR FOR DETERMINING DIAPHRAGM ADJUSTMENT

Harry D. McCarty, Chicago, Ill.

Application June 10, 1950, Serial No. 167,458

4 Claims. (Cl. 88—23)

My invention relates to an exposure determining device adapted to quickly and accurately determine the proper diaphragm opening of the lens to be used in taking a picture. More particularly, I have provided a structure which may be incorporated in a camera or provided as an accessory adapted for comparing the light and color intensity of an entire scene with an illuminated standard. The actual lens (or equivalent lens) used in making the exposure may be directly set at the proper diaphragm opening without the need for consulting a chart or the necessity of making an empirical calculation.

Exposure meters embodying the use of a photoelectric cell are well known to the art. Meters employing visual photometric comparison methods are also well known. The use of either type of meter, however, involves a three-step operation. First, the light intensity of the image is determined by consulting a scale on the meter. Second, a chart is used or an empirical calculation made to determine the proper lens setting for a predetermined shutter and film speed. Third, the lens is then adjusted to the thus determined setting. My invention eliminates the need for a chart or empirical calculations by allowing the lens to be directly adjusted so that the light and color intensity of the image to be photographed is equalized with an illuminated standard. When, by adjusting the aperture of the actual lens to be used for the picture (or an equivalent lens), the brilliance of the image is equal to the brilliance of the standard, the aperture of the lens is then correct for a properly exposed photograph.

A further disadvantage of the type of exposure meters known to the art is the fact that these meters are only useful in determining the average light intensity of the image. In other words, by using these meters it is impossible to determine in advance of processing the different shades and intensities which appear in various portions of the entire image. Particularly where it is desirable to produce special effects, as for example unusual backgrounds or shadows or unusual color effects, these meters are ineffective. My invention, in allowing the actual image to be viewed and compared with an illuminated standard, not only provides for correct exposure but also allows the photographer to determine the effect which will be produced in advance of processing.

It is, therefore, an object of my invention to provide a rapid and accurate exposure determining device.

A further object is to provide a light comparator which will allow the aperture of a lens to be quickly and directly set at the proper opening without reference to an empirical chart or without requiring an empirical calculation.

Another object is to provide a structure for determining photographic exposure by comparing the image to be photographed with an illuminated standard, said comparison being made at the time that the lens aperture is adjusted to the correct opening.

Another object is to provide an exposure determining device which will enable the photographer to determine the overall lighting effects or desired effects which will be accomplished in advance of processing.

Another object is to provide an exposure meter of the character described which may be mounted in a camera or used as an independent unit.

Another object is to provide an exposure determining device which is highly efficient in operation and yet simple and inexpensive to manufacture.

Another object is to provide a method of determining proper photographic exposure by comparing the light intensity of the actual image to be photographed with a fixed standard.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Fig. 1 is a front elevational view of a turret camera showing a pair of lenses on the turret and the light comparator behind the turret.

Fig. 2 is an enlarged rear elevational view of the light comparator.

Fig. 3 is a sectional view, taken substantially along line 3—3 of Fig. 2 and showing the turret and the lens in elevation.

Fig. 4 is a sectional view, taken along line 4—4 of Fig. 3 showing one of the two bulb mountings in elevation.

Fig. 5 is an exploded view of the elements in the light comparator.

Fig. 6 is a plan view, on a reduced scale, of the turret camera.

Fig. 7 is a front elevation of the light comparator in a unit independent of a camera.

Fig. 8 is a sectional view, taken along line 3—3 of Fig. 7 showing the lens in elevation and the electrical components removed therefrom.

Fig. 9 is a sectional view, taken along line 9—9 of Fig. 8.

Fig. 10 is a schematic representation of the electrical circuit.

Fig. 11 is a view of a modified structure including a light carrying disc.

Fig. 12 is a view similar to Fig. 11 but showing a special incandescent lamp which may be used in the comparator.

Referring to the drawings, it will be seen that the light comparator, generally indicated at 21, may be mounted either in a camera 22 (Figs. 1 through 6) or may be used in an independent unit (Figs. 7 through 9).

The camera 22, as illustrated, is of the turret type having a turret 23 on the front thereof, said turret being provided with two or more lenses 24, each lens having an adjustable diaphragm 25 preferably of the iris type as shown. The turret 23 is pivoted about a trunnion 26 so that a lens 24 may be swung in front of the light comparator 21, shutter (not shown) or forcusing position.

The light comparator 21 illustrated in Fig. 1 to Fig. 6, inclusive, includes a suitable mounting plate 27 so that it may be mounted in the forward wall 28 of the camera 22 by sccews 29 or by other suitable fastening means. The comparator 21 is so positioned that when a lens 24 is swung before it, light passing through the lens will strike the comparator. Referring to Fig. 6, it will be noted that the comparator may be viewed through a viewing lens 30 mounted on the side of the camera 22 behind an opening 31 in the camera side wall 32.

The light comparator 21 is preferably fashioned from sheet metal stock but obviously may be molded in one piece, and it includes an outer tube or housing 33 having a central passageway 34 therethrough. The passageway 34 is defined by an inner tube 35 preferably rectangular in section, said inner tube and the outer tube or housing 33 being joined by means of a front wall 36 which completely closes the front of the comparator in the area between the inner tube 35 and outer tube or housing 33. The inner tube 35 is shouldered at its rear end 37 so as to allow for the mounting therein of an image-bearing screen 38. The screen 38 is fashioned from ground glass or other material suitable for having an image appear thereon. It should be apparent that when a lens 24 is positioned in front of the light comparator 21, light passing therethrough will strike the image-bearing screen 38 and the image of any object upon which the lens 24 is focused will appear on and be carried by the screen 38. A light standard 39 surrounds the image-bearing screen 38 and is positioned in the area between the inner tube 35 and the outer tube or housing 33. The standard is fashioned from transparent material, such as celluloid or glass, and preferably has a cutout center portion 40 of such size as to allow the image appearing on the screen to be viewed therethrough. It should be apparent that instead of a cutout center portion, the center 40 could be made of clear transparent material so that the screen 38 could be viewed. In this case, however, the standard would be placed adjacent the screen 38, instead of in the same plane; or the screen and standard could be constructed in one piece, but the structure as shown is preferable. The standard 39 has a plurality of colored sections 41 and colored background sections 41a, said sections comprising various colors of the spectrum. When the standard is illuminated, in a manner to be presently described, the colors appearing thereon will be clearly visible. While the standard has been illustrated as having different colors thereon in geometric arrangement, it may be composed of any transparent sheet containing various colors of the spectrum, as for example a natural color photograph.

The outer tube or housing 33 is provided with apertures 42 so that light from a light source 43 may pass into the interior of the light comparator in the area between the inner tube 35 and outer tube 33 with consequent illumination of the light standard 39. Referring to Fig. 4, it will be seen that the light source may consist of conventional incandescent bulbs 44 carried in sockets 45, each socket being removably frictionally mounted upon an external circular mounting flange 46 so that the bulbs 44 may be readily replaced should they burn out. The sockets 45 and mounting flanges 46 are constructed so as to prevent the bulbs 44 from illuminating the area outside of the light comparator 21. Further, by positioning the screen 38 in the inner tube 35, light rays illuminating the standard 39 cannot strike the screen 38, nor can light rays passing through the lens 24 and appearing on the screen 38 strike the standard 39.

Conduits 47 connect the bulbs to the electrical circuit shown schematically in Fig. 10. The bulbs 44 are energized by suitable batteries 48, preferably dry cells, and the amount of current flowing therethrough may be varied by a rheostat 49. An ammeter 50, in series with the circuit, indicates the amount of current flowing therethrough and a switch 51 opens and closes the circuit.

To obtain more even diffusion of the light entering the light comparator a diffusing disc 52 may be positioned between the inner tube 35 and outer tube or housing 33 between the light standard 39 and the apertures 42. In order to retain the diffusing disc 52 in position, an annular bead 53 is provided in the outer tube or housing 33. A band 54 positioned between the diffusing disc 52 and the light standard 39 holds the diffusing disc in position against the annular bead 53. A retaining band 55 holds the light standard 39 against the band 54. In order to assure proper alignment of the light standard 39 and to aid in the insertion of the retaining band 55, band 54 and diffusing disc 52, notches 56a and 56b are provided in the light standard 39 and diffusing disc 52 and the retaining band 55 and band 54 are split or otherwise formed to provide slots 57 so that these parts may be slipped over a rib 58 on the inside face of the outer tube or housing 33.

Before the light comparator may be used to correctly determine exposure, the level of light intensity of the bulbs 44 must be experimentally determined for a given film speed and shutter speed. This is done by determining the amount of current flowing through the circuit which will illuminate the standard 39 to such an intensity that by matching the light and color intensity of the image appearing on the screen 38 with that of the illuminated standard 39, a correct exposure will be obtained. Naturally, for different film and shutter speeds another level of light intensity must be ascertained in advance of use.

Once the correct illumination of the standard 39 has been determined for a certain film and shutter speed, when the bulbs 44 are energized, the light standard 39 surrounding the image bearing screen 38 will be illuminated and the colors appearing thereon may be viewed through the viewing lens 30. When one of the lenses 24 is positioned in front of the comparator 21 and focused upon an object, an image will appear on the screen 38. By adjusting the diaphragm 25 of the so positioned lens 24, the light and color intensity of the image appearing on the screen 38 may be varied so as to match the light and the color intensity of the illuminated light standard 39. Matching the light and color intensity of the image with the standard in the manner above described will provide the correct lens aperture for a proper photographic exposure. All that must then be done is to swing the turret 23 into the photographing position and the photograph may be taken without further adjustment of the lens aperture.

The ammeter 50 and rheostat 49 not only aid in determining the correct level of illumination of the standard 39, but also allow for compensation of the circuit due to changes in the strength of the batteries 48. As the batteries 48 change in strength, the rheostat 49 is adjusted so that the amount of current flowing through the circuit (as indicated on the ammeter 50) always corresponds to that determined as being correct before the comparator is used.

If the exposure is to be made with natural light, the light comparator will operate more efficiently if a filter (not shown) is placed over the lens 24. When natural light is used, the image appearing on the screen 38 will be more blue than the artificially illuminated light standard 39. By placing an orange filter, known to the art as C-4, over the lens 24, the colors of the image appearing on the screen 38 may be more accurately compared with the illuminated standard 39. If the object to be photographed is artificially illuminated, other appropriate filters may be used or none may be necessary, depending upon the quality of the artificial illumination.

Referring to the alternate embodiment of the invention shown in Figs. 7, 8 and 9, it will be seen that the light comparator 21 may also be used in an independent unit. For purposes of the present description like numbers have been assigned to identify the component parts. A container 59 is attached to the outer tube or housing 33, said container having a partial top wall 60 connected to and extending rearwardly from the rear of the outer tube or housing 33 and upwardly inwardly inclined walls 61 suitably attached to the outer tube or housing 33 at points substantially midway on its periphery. The container 59 has a removable bottom 62 so that batteries 48 and bulbs 44, which illuminate the light standard 39 by means of light rays passing through the apertures 42, may be replaced when expended.

A viewing housing 63 is mounted on the rear of the light comparator 21 so that the screen 38 and light standard 39 may be viewed through the viewing lens 30 in the rear of the housing 63. It should be noted that the viewing lens 30 is not in axial alignment with the image bearing screen 38. I have found that if the screen is viewed directly from the rear, a bright or "hot" spot will appear in the center of the screen. To obviate this undesirable feature, I have placed the viewing lens off center both in the independent unit, as shown in Fig. 8 and in the camera, as shown in Fig. 6. I have also found that by placing the viewing eyepiece off center, that portion of the image bearing screen 38 closest the eye may appear brighter than that portion furthest from the eye. To make the image appearing on the screen 38 appear evenly illuminated, the screen 38 may be fashioned as a density wedge, with the thicker portion of the screen being on the side nearest the viewing eyepiece; or, an emulsion may be placed over the screen in an appropriate manner, for example by making the portion of the screen nearest the eye darker than that portion of the screen which is farthest from the eye, to achieve this result.

The independent unit includes a switch 51, ammeter 50 and rheostat 49 connected electrically, as shown in Fig. 10, with the batteries 48 and bulbs 44 in the same manner as when the light comparator 21 is mounted in a camera.

When used independently of a camera, it is preferable to make the lens 24 detachable so that once the diaphragm setting has been determined, the same lens may be readily removed and inserted in the camera. For this purpose, pins 64 project from the front wall 36 of the light comparator 21 and the lens is provided with bayonet slots 65 on a lens mounting plate 66 for rapid attachment and removal. If a different lens is to be used, it is preferable that the lens 24 and the lens of the camera (not shown) have the same light transmission qualities so that the same setting which is read off the lens 24 may be made on the lens of the camera. Should the camera lens and the lens 24 differ in light transmission qualities (for example one lens is coated and the other is not), a compensating calculation may be made in advance.

Fig. 11 illustrates a modification of the means used to illuminate the light standard 39. This modification consists of a disc 67 fashioned from a methyl-acrylic resin such as "Lucite" or other suitable material which is capable of carrying light through its body. Such a disc 67 may be inserted between the inner tube 35 and the outer tube or housing 33 in alignment with the apertures 42. When the bulbs 44 are illuminated, the light will be carried in the disc 67, illuminating said disc and providing for an even illumination of the standard.

Fig. 12 illustrates an incandescent doughnut-shaped bulb 68 which may be used in place of the bulbs 44. The doughnut bulb 68 may be inserted in the area between the inner tube 35 and outer tube or housing 33 between the light standard 39 and the front wall 36. Such a structure would eliminate the necessity of the apertures 42 in the outer tube or housing 33, other than such as would be necessary for the electrical connection to the bulb 68.

It should be apparent that I have provided a structure for the rapid and accurate determination of proper photographic exposure which is especially useful in color photography. While I have disclosed structures which efficiently and accurately accomplish the desired results, it should be further apparent that my invention is capable of modification without departing from the scope thereof which, it is to be understood, is limited only by the purview of the appended claims.

I claim:

1. In an exposure determining device, an inner tube, an outer tube spaced from and surrounding said inner tube, a wall connecting said tubes at one end to prevent outside light rays from entering the area between said tubes at said end, a screen in said inner tube, means for forming an image on the screen corresponding to the field to be photographed, a transparent standard between said inner and said outer tubes substantially in the plane of said screen, said standard having a plurality of differently colored comparison areas, and means to illuminate said standard to a predetermined brilliance, whereby the component image colors can be compared with the comparison areas.

2. In combination with a lens having an adjustable diaphragm, an exposure determining device comprising an inner tube in axial alignment with said lens, an outer tube spaced from and surrounding said inner tube, a wall connecting the walls of said tubes at one end to prevent outside light rays from entering the area between said tubes at said end, a screen in said inner tube, means for forming an image on the screen corresponding to the field to be photographed, a transparent standard in said outer tube substantially in the plane of said screen, said standard surrounding said inner tube and having a plurality of differently colored comparison areas, and means to illuminate said standard to a predetermined brilliance, whereby the component image colors can be compared with the comparison areas.

3. In combination with a lens having an adjustable diaphragm, an exposure determining device comprising an inner tube in axial alignment with said lens, an outer tube spaced from and surrounding said inner tube, a wall connecting the walls of said tubes at one end to prevent outside light rays from entering the area between said tubes at said end, an image bearing screen in said inner tube, a multicolored transparent standard in said outer tube substantially in the plane of said screen, said standard surrounding said inner tube, means to illuminate said standard to a predetermined brilliance, a viewing aperture out of axial alignment with said screen and said lens for viewing said image bearing screen, and means provided on said screen for darkening that portion of said screen nearest said viewing means relative to that portion of said screen farthest from said viewing means.

4. An exposure determining device for directly determining the proper diaphragm setting of a photographic lens, comprising a photographic lens having an adjustable diaphragm, an image bearing screen behind and in axial alignment with said lens, said screen being adapted to have light passing through said lens focused thereon, a multicolored abstract standard surrounding said screen, a viewing aperture out of axial alignment with said screen and said lens for viewing said image bearing screen, means provided on said screen for darkening that portion of said screen nearest said viewing means relative to that portion of said screen farthest from said viewing means, and means to illuminate said standard alone to a predetermined brilliance, whereby the proper diaphragm setting of said lens for photographing the image appearing on said screen may be obtained by viewing said screen through said viewing means and adjusting said diaphragm to match the intensity of the image appearing on said partially darkened screen with said standard.

HARRY D. McCARTY.

References Cited in the file of this patent

UNITED STATES PATENTS

| Number | Name | Date |
| --- | --- | --- |
| 1,213,485 | Herz | Jan. 23, 1917 |
| 1,315,972 | Lacroix et al. | Sept. 16, 1919 |
| 1,437,399 | Comstock | Dec. 5, 1922 |
| 1,483,472 | Norton | Feb. 12, 1924 |
| 1,762,048 | Camp | June 3, 1930 |
| 2,147,902 | Jakosky | Feb. 21, 1939 |
| 2,282,253 | Shaub | May 5, 1942 |
| 2,303,905 | Bender | Dec. 1, 1942 |
| 2,440,266 | Hall | Apr. 27, 1948 |
| 2,575,536 | Thompson | Nov. 20, 1951 |

FOREIGN PATENTS

| Number | Country | Date |
| --- | --- | --- |
| 767,378 | France | May 1, 1934 |